US010176039B2

(12) United States Patent
Amato et al.

(10) Patent No.: US 10,176,039 B2
(45) Date of Patent: Jan. 8, 2019

(54) SELF-ACCUMULATING EXCLUSIVE OR PROGRAM

(71) Applicant: Micron Technology, Inc., Boise, ID (US)

(72) Inventors: Paolo Amato, Pagazzano (IT); Marco Sforzin, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 14/491,544

(22) Filed: Sep. 19, 2014

(65) Prior Publication Data

US 2016/0085625 A1    Mar. 24, 2016

(51) Int. Cl.
*G06F 11/10* (2006.01)
*G06F 3/06* (2006.01)
(Continued)

(52) U.S. Cl.
CPC .......... *G06F 11/1048* (2013.01); *G06F 3/064* (2013.01); *G06F 3/0619* (2013.01);
(Continued)

(58) Field of Classification Search
CPC ............... G06F 3/0608; G06F 11/1048; G06F 11/1666; G06F 3/0619; G06F 3/064;
(Continued)

(56) References Cited

U.S. PATENT DOCUMENTS 5,208,813 A * 5/1993 Stallmo ............... G06F 11/1092
714/6.32
5,274,799 A * 12/1993 Brant .................. G06F 11/1076
711/E12.04
(Continued)

FOREIGN PATENT DOCUMENTS

WO    WO-2016044520 A1    3/2016

OTHER PUBLICATIONS

"International Application Serial No. PCT/US2015/050572, International Search Report dated Feb. 23, 2016", 4 pgs.
(Continued)

*Primary Examiner* — Phung M Chung
(74) *Attorney, Agent, or Firm* — Schwegman Lundberg & Woessner, P.A.

(57) ABSTRACT

Methods and apparatus for Exclusive OR (XOR) programming of a memory device include a program internal to a device calculates parity or other values using an XOR Program Rule. In some embodiments, the program generates and stores a parity result directly in the memory device itself without intervention by an external controller. A method of parity generation in a memory device comprises executing an internal self-accumulating parity program, wherein the program accumulates a parity sum by superimposing newly accumulated parity information over previously stored parity information in the auxiliary memory system. In a stand-alone device embodiment, a new command "XOR program" is received with address and input data parameters causing stored data to be read at the input address and an XOR operation of the read data and new input data is performed. The results of the computation are written into memory.

21 Claims, 8 Drawing Sheets

(51) Int. Cl.
*G11B 20/18* (2006.01)
*G11C 29/00* (2006.01)
*G06F 9/00* (2006.01)
*G06F 11/00* (2006.01)

(52) U.S. Cl.
CPC .............. *G06F 3/0679* (2013.01); *G06F 9/00* (2013.01); *G06F 11/00* (2013.01)

(58) Field of Classification Search
CPC ... G06F 3/0679; G11B 20/1883; G11C 29/88; G11C 29/08; H03M 13/255; H03M 13/271; H03M 13/1137; H03M 13/2906; H03M 13/2792; H03M 13/2707; H03M 13/616; H03M 13/611; H03M 13/1148; H03M 13/118; H04L 1/0057; H04L 1/0071; H04L 1/00; H04L 27/2626
See application file for complete search history.

(56) References Cited

U.S. PATENT DOCUMENTS

| | | | |
|---|---|---|---|
| 5,373,512 A | 12/1994 | Brady | |
| 5,638,317 A | 6/1997 | Tran | |
| 5,737,744 A * | 4/1998 | Callison | G06F 11/1076 711/114 |
| 5,801,985 A * | 9/1998 | Roohparvar | G11C 5/04 365/185.01 |
| 6,151,641 A | 11/2000 | Herbert | |
| 6,282,670 B1 * | 8/2001 | Rezaul Islam | G06F 11/1096 711/114 |
| 7,822,921 B2 * | 10/2010 | Taylor | G06F 3/0611 711/114 |
| 8,156,368 B2 | 4/2012 | Chambliss et al. | |
| 8,650,458 B2 * | 2/2014 | Kim | G06F 11/1068 714/758 |
| 8,812,933 B2 * | 8/2014 | Joo | G11C 16/10 365/185.09 |
| 2002/0065984 A1 | 5/2002 | Thompson et al. | |
| 2008/0109616 A1 | 5/2008 | James | |
| 2010/0172190 A1 | 7/2010 | Lavi et al. | |
| 2010/0308858 A1 | 12/2010 | Noda et al. | |
| 2011/0191649 A1 * | 8/2011 | Lim | H03M 13/05 714/752 |
| 2012/0023281 A1 | 1/2012 | Kawasaki et al. | |
| 2013/0246891 A1 | 9/2013 | Manning et al. | |
| 2016/0029406 A1 * | 1/2016 | Papasakellariou | H04L 1/0061 370/329 |

OTHER PUBLICATIONS

"International Application Serial No. PCT/US2015/050572, Written Opinion dated Feb. 23, 2016", 8 pgs.

"International Application Serial No. PCT/US2015/050572, International Preliminary Report on Patentability dated Mar. 30, 2017", 10 pgs.

* cited by examiner

US 10,176,039 B2

SELF-ACCUMULATING EXCLUSIVE OR PROGRAM

BACKGROUND

Devices and Integrated Circuit (IC) systems external to host controllers have a command set to implement different operations, such as read, write, erase, program, and other functions. The external controller or host processor perform other operations, often relying on result of commands in the command set. It is desirable to have an improved command set to improve overall efficiency of the eternal devices and device systems.

BRIEF DESCRIPTION OF THE DRAWINGS

Some embodiments of the disclosed technology are illustrated by way of example and not limitation in the figures of the accompanying drawings in which.

DETAILED DESCRIPTION

Methods and apparatus for an improved command set having a self-accumulating Exclusive OR (XOR) command are disclosed. In one embodiment, a single IC devices comprises an XOR program. In another embodiment, a self-accumulating parity function for a memory system implemented using the XOR command is provided as merely one example of improved functionality. In the memory parity example, a program internal to an auxiliary memory system accumulates parity using an Exclusive Or (XOR) Program Rule. The program generates and stores the parity result directly in internal memory cells of the auxiliary memory system itself, without intervention by an external controller after an external controller issues a program command to the auxiliary memory system. The method of parity generation in an auxiliary memory system comprises receiving a self-accumulating parity program command, and in response, executing an internal self-accumulating parity program, wherein the program accumulates a parity sum by superimposing updated parity information over previously stored parity information in the auxiliary memory system.

Figure 1:
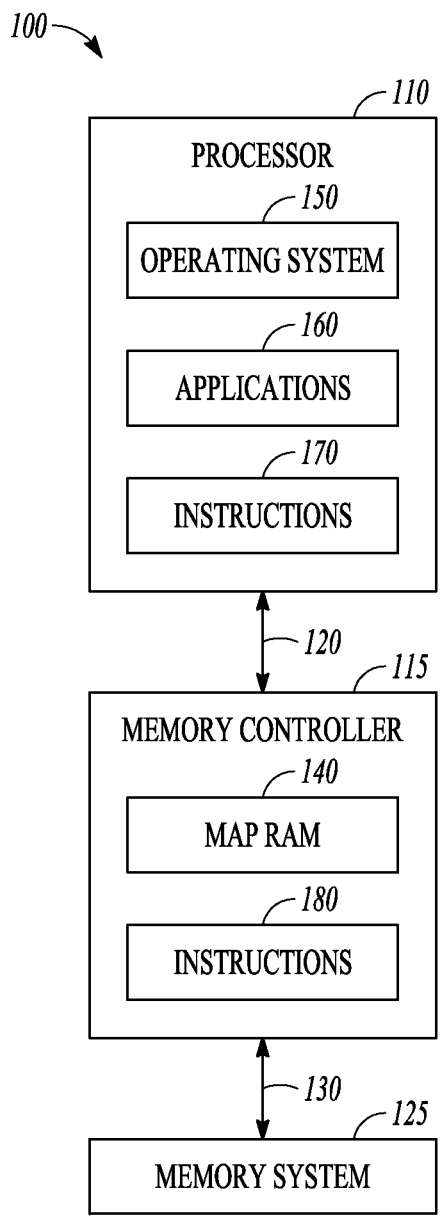
FIG. 1 is a high level diagram of a memory system.

FIG. 1 is a high level diagram of a system 100, that may be referred to as an IC system in some cases. As shown, FIG. 1 illustrates an IC system 100 for storing and retrieving data from memory in a multi-channel memory system. The IC system 100 may include a processor 110 coupled to a memory controller 115 through a first bus 120. The memory controller 115 may be coupled to a memory system 125 through a second bus 130. The memory controller 115 may execute memory transaction requests from the processor 110. The memory controller 115 transfers data between the processor 110 and the memory system 125 over the first and second buses 120 and 130. The first bus 120 and the second bus 130 may employ a known protocol to connect the processor 110 to the memory controller 115 and to connect the memory controller 115 to the memory system 125. Some examples of system 100 may include personal computers, laptop computers, tablets, personal digital assistants (PDAs), mobile phones, digital cameras, electronic games, digital media player/records, and the like.

The memory system 125 may comprise one or more physical devices (not shown) each comprising one or more physical channels (not shown) for storing and accessing data. The memory system 125 may also comprise a single IC configured to have an improved command set including a self-accumulating XOR program command. The memory system 125 is described in more detail below in relation to the example self-accumulating parity function for a memory device.

The processor 110 may also be referred to as a master, and there may be more than one master in IC system 100. An operating system (OS) 150 and one or more applications 160 may execute on the processor 110. The OS 150 may request memory in the memory system 125 on behalf of the one or more applications 160. The memory system 125 may accumulate its own parity values when directed by a command from the OS 150. The OS 150 may further program channel depth values for the regions of the memory system in the map Random Access Memory (RAM) 140.

In other embodiments, the memory controller 115 may be co-located with the processor 110. In some embodiments, the processor 110 may be a system-on-chip (SOC) and the processor 110 may use the memory controller 115 to perform memory operations on the memory system 125. In yet other embodiments, the Self-Accumulating Exclusive OR Program may be implemented in a single Integrated Circuit (IC) configured to comprise program instructions for implementing an XOR program command.

The IC system 100 may include a computer-readable medium on which is stored one or more sets of instructions 180 (e.g., software) embodying any one or more of the methodologies or functions described herein. The instructions 180 may reside, completely or at least partially, within the processor 110 or the memory controller 115 during execution thereof by the IC system 100, with the processor 110 and the memory controller 115 also constituting computer-readable media.

The computer-readable medium may be a single medium or may be multiple media (e.g., a centralized or distributed database, and/or associated caches and servers) that store the one or more sets of instructions. "Computer-readable medium" may include any non-transitory medium that is capable of storing, encoding, or carrying a set of instructions of execution by the machine. By way of example and not limitation, "computer-readable medium" may include solid-state memories, optical media, or magnetic media.

Figure 2:
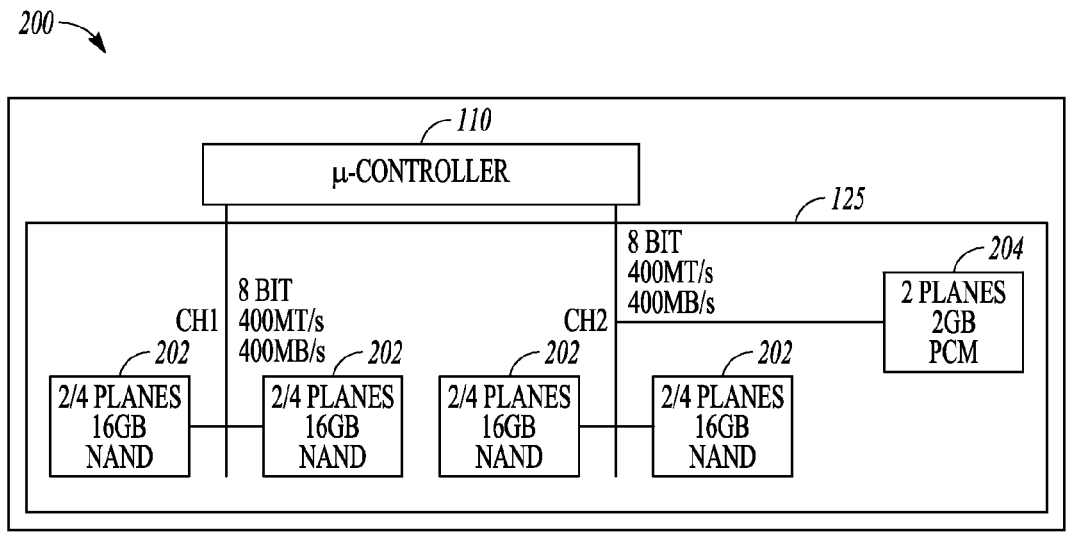
FIG. 2 is a block architecture diagram of a hybrid memory system.

FIG. 2 is a block architecture diagram of a Hybrid Memory System (HMS) 200. In a HMS 200, an external controller (or processor) 110 and one or more auxiliary Non-Volatile memory system 204 support one or more Not AND (NAND) Flash modules 202 in order to gain performance or to save energy and cost compared to a Standard Static RAM (SRAM) or Dynamic RAM (DRAM) implementation. The auxiliary memory system 204 is shown as a Phase Change Memory (PCM) system as an example. However, the auxiliary memory system 204 function may also be provided by any other known or emerging technology memory type, such as Ferroelectric RAM (FeRAM), Spin Transfer Torque Magnetic RAM (STTMRAM), etc. The auxiliary memory system 204 may be used to generate and store parity values for restoring the lost or corrupted data of flash 202, or other, memory. On the contrary, in a traditional HMS, the external controller (or processor) 110 computes parity values of data in NAND modules 202 and stores the result in auxiliary memory system 204.

Figure 3:
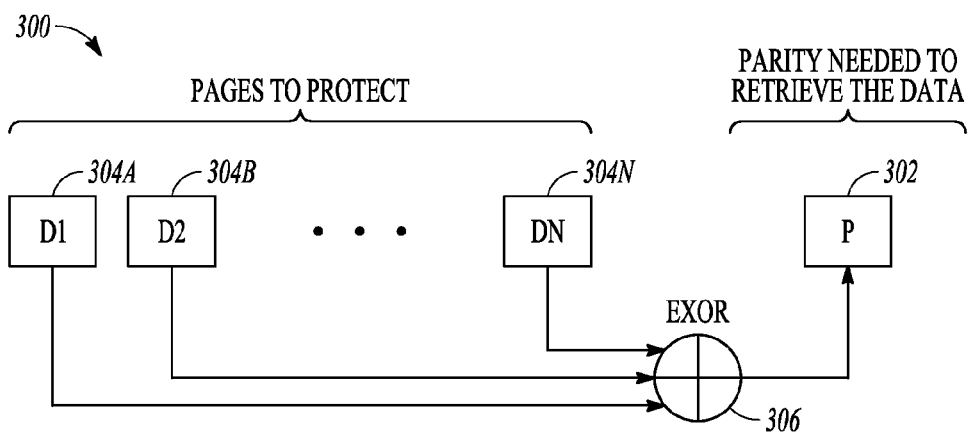
FIG. 3 illustrates a traditional parity calculation.

FIG. 3 illustrates a traditional parity calculation 300. Memory systems are used in many electronic devices such as personal digital assistants (PDAs), laptop computers, mobile phones and digital cameras. In one embodiment of an improved command set, an Exclusive OR Program calculations on data stored in these memory devices provide for a possibility of rebuilding lost or corrupted data stored in these systems.

Traditional memory parity calculation and storage schemes have been known to protect data by using an external controller (or processor) to calculate a parity value for flash memory (other memory types), and then writing the external controller generated parity value to an auxiliary non-volatile memory device. While crudely effective, such awkward and inefficient external controller based parity schemes may not meet the needs of systems with varying performance and/or power requirements because the controller creates substantial system overhead during read and write operations that are used to calculate and store parity.

As shown, FIG. 3 illustrates a traditional parity calculation 300 for a memory system such as the systems illustrated in FIGS. 1 and 2 (100 and 200). In the HMS 200 of FIG. 2, scaling nodes of NAND Flash 202 technology under 20 nanometers (nm) deteriorates the reliability of the memory in such a way that the probability of on-field Word-Line (WL) shorts are not negligible. A well-known method to contain the loss-data problem caused by WL-WL shorts in Solid State Disk (SSD) is Redundant Array of Independent NAND (RAIN). RAIN methods store the parity Exclusive Or (XOR) sum of independent NAND pages of a memory stripe area, so that in an event of failure, the lost data in the WL-WL short may be recovered.

The parity calculation is typically performed by the external controller 110 by accumulating intermediate parity values in a temporary storage areas, and then saving the final parity value(s) in the auxiliary memory system 204. Exclusive OR Program 302 is calculated by summing, using an XOR function 306, all of the memory page structures to be protected 304.

In other words, the parity P is calculated as:

$$P + \sum_{i=1}^{n} D_i = D_j + \sum_{i=1(i \ne j)}^{n} D_i \quad \text{(Equation 1)}$$

where D1, D2, . . . Dj, . . . , Dn are the data of the n pages (e.g., Di is the data of page i)

Saving the parity of n pages allows for recovering an original page of data from a page that may have been lost or corrupted. For example, data Dj for page j may be recovered by subtracting the parity sum of all pages except page j from the total parity sum, P, as shown below:

$$D_j = P - \sum_{i=1(i \ne j)}^{n} D_i \quad \text{(Equation 2)}$$

This calculating of parity 302 using an external controller 110 and saving the parity sum 302 in the auxiliary memory system 204 is inefficient in terms of time and power resources. A logical representation of the traditional RAIN mechanism is shown in FIG. 4 below.

Figure 4:
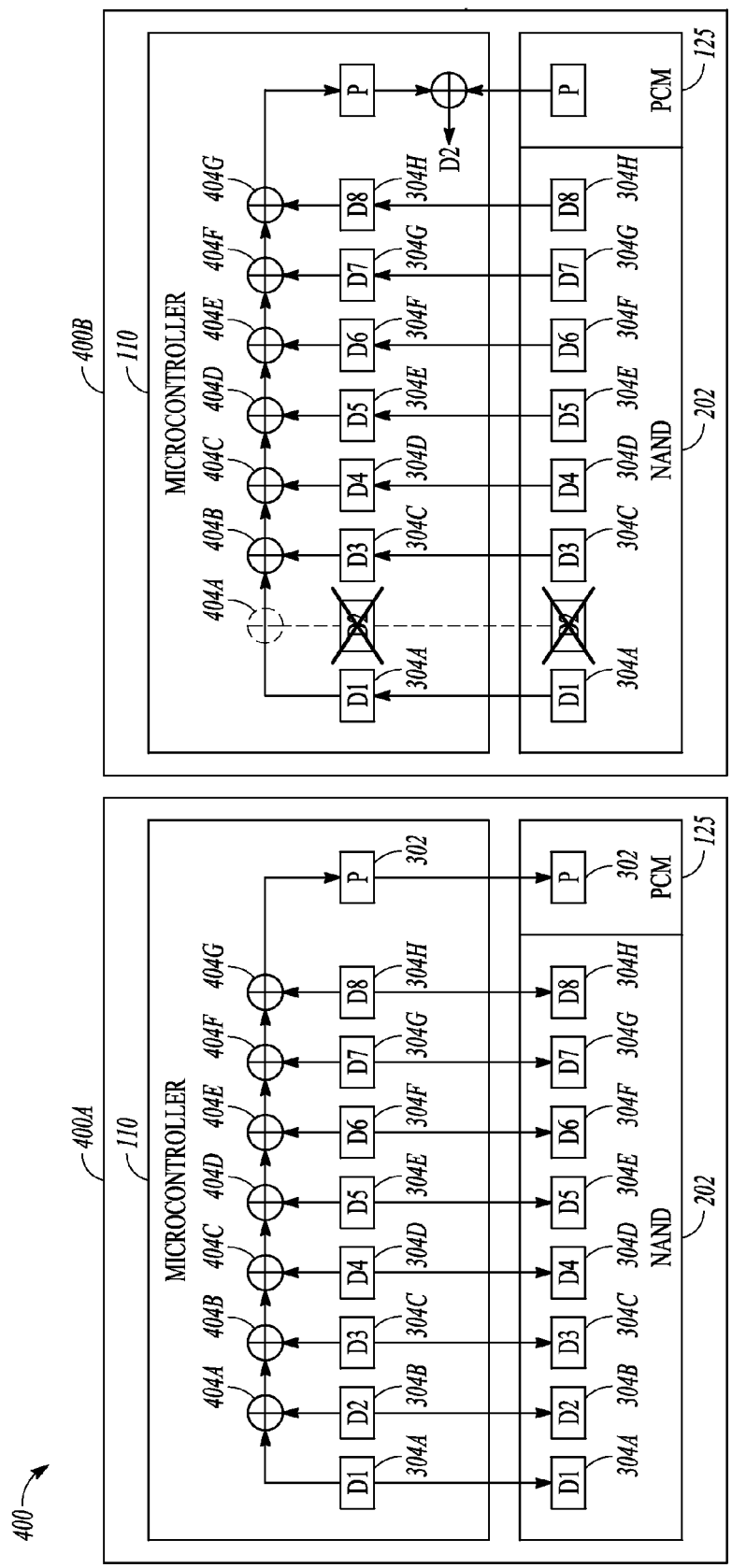
FIG. 4 logically illustrates a traditional method of calculating parity using an external controller to calculate a parity value for flash memory, and then writing the external controller generated parity value to an auxiliary non-volatile memory device.

FIG. 4 logically illustrates a traditional method of calculating parity 400 using an external controller to calculate a parity value for flash memory, and then writing the controller generated parity value to an auxiliary non-volatile memory device 400. As shown, FIG. 4 logically illustrates a traditional RAIN mechanism for calculating parity 302 in an external controller 110, and transmitting data to NAND memory 202 and parity 302 to an auxiliary memory system 204, or other memory system type. In a logical representation of a traditional RAIN parity value calculation and storage operation 400A, pages $D_1$-$D_8$ (304a-304h) are summed by summers 402a-402g to produce a parity (P) 302 for pages $D_1$-$D_8$ (304a-304h) according to Equation 1. Pages $D_1$-$D_8$ (304a-304h) are written to NAND memory 202 and the new parity is written to Auxiliary memory system 204. In a logical representation of a traditional RAIN parity data restoration operation 400B, missing or corrupted data recovery of page $D_2$ 304b may comprise reading undamaged data pages 304a and 304c-304h from NAND memory 202 and the parity value from the auxiliary memory system 204. Page recovery is performed by the external controller 110 by comparing the partially recalculated parity value with the stored parity value according to Equation 2 in order to restore the original data page $D_2$.

Figure 5:
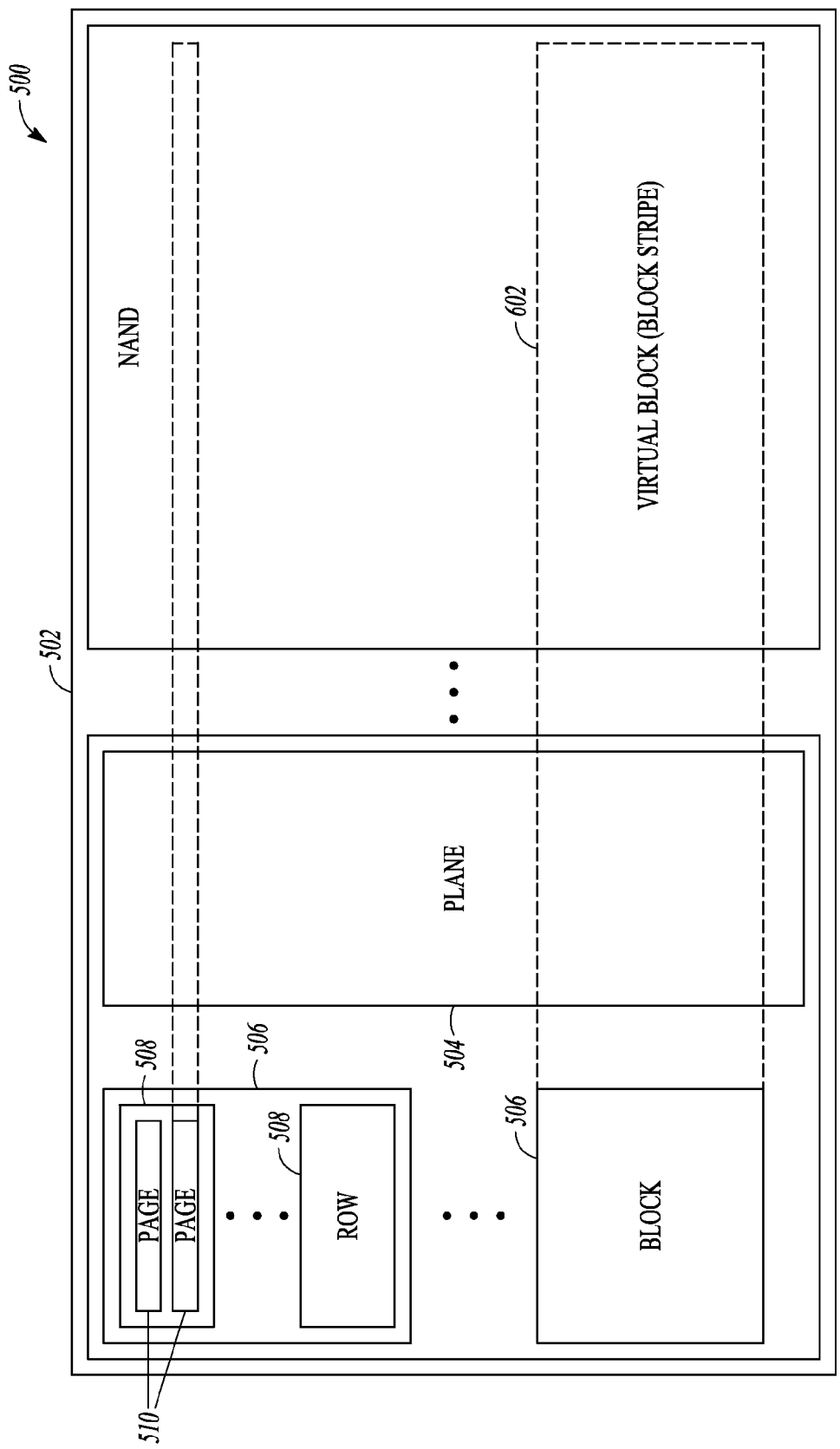
FIG. 5 is a high level block diagram illustrating a standard Not AND (NAND) memory system.

FIG. 5 is a high level block diagram illustrating a standard Not AND (NAND) memory system 500. A NAND system 500 may be composed of one or more NAND devices 502. Each NAND device 502 may comprise one or more Plane 504 data structures. Each Plane 504 data structure may comprise one or more Block 506 data structures. Each Block 506 may comprise multiple Physical Rows 508. Each Physical Row 508 may comprise multiple Page 510 data structures. In the NAND memory system 500, all the Planes 504 may be active simultaneously. A single read access in a NAND system may involve one Page 510 per Plane 504, where pages 510 may be read simultaneously. An erase operation in a NAND memory system 500 may involve 1 Block 506 per Plane 504, where Blocks 506 are also erased simultaneously. A Virtual Block 602 and a traditional XOR parity calculation for a Virtual Block 602 of a NAND memory system 500 are detailed in FIG. 6.

Figure 6:
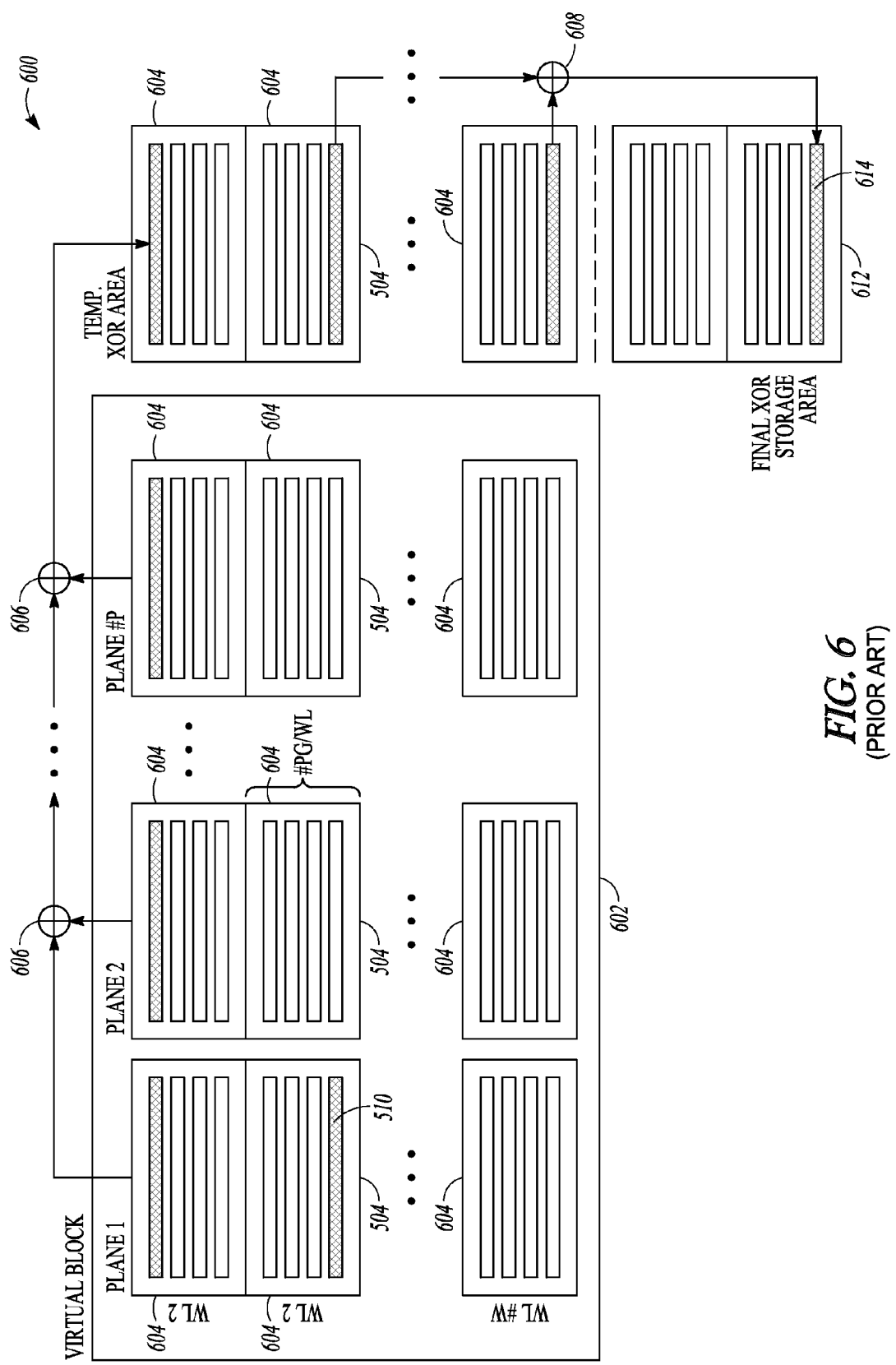
FIG. 6 is a high level block diagram illustrating a standard two operation parity calculation.

FIG. 6 is a high level block diagram illustrating a standard two operation parity calculation 600. As shown, FIG. 6 is a logical representation of a traditional two operation XOR parity calculation for a NAND memory system 600. A Virtual Block 602 may comprise homologous blocks of active planes 504. The number of these homologous blocks is the number of NAND devices 502 multiplied by the number of Planes 504 per NAND device 502. Each Virtual Block (or Block Stripe) 602 comprises physical WL 604 structures belonging to each Plane 504. Each WL 604 contains a number of pages 510 depending on the NAND's 202 dimensional geometry (2 Dimensional or 3 Dimensional), as well as on the NAND's 202 architecture (All Bit Line or Interleaving) and on the number of bits stored per cell (bpc). For example, a 2 bpc 2 Dimensional (2D) Interleaved NAND has four pages 510 per WL 604. In another example, a 2 bpc 3 Dimensional (3D) All Bit Line (abl) NAND has 16 pages 510 per WL 604.

The traditional XOR calculation comprises two XOR operations. The first XOR calculation is performed when accessing the Virtual Block 602 (i.e. the Block Stripe) and is equal to an XOR sum of all the pages 510 in the Virtual Block 602. In other words, each page 510 of a corresponding Plane 504 WL 604 is summed WL by WL using XOR summers 606. The results of this first XOR operation are traditionally stored in corresponding WL 616 locations of a temporary XOR result storage area 610.

When all of the pages 510 in the Virtual Block 602 have been completely summed, the second XOR operation sums the even numbered page results from the first XOR operation that are stored in the temporary XOR result storage area 610 at summer 608 to produce an even page parity result. The second XOR operation then sums the odd numbered page results from the first operation that are stored in the temporary XOR result storage area 610 at summer 608 to produce an odd page parity result. The Virtual Block 602 is closed after completion of the second XOR operations, and the Parity information comprising one even page and one odd page parity sum 302 is permanently stored in stripe 614 of final XOR storage area 612. The intermediate XOR page sums 616 are temporary pages that are not permanently retained in the temporary XOR storage area 610 after permanent storage in the XOR stripe 614 of the final XOR storage area 612.

Unfortunately, this traditional method of producing and storing parity results for memory systems (100 and 200) by an external controller 110 detailed in FIGS. 3-6 are costly and inefficient because the external controller 110 read and write operations with the nonvolatile memory 202 and auxiliary memory system 204 generate significant time and energy overhead.

Figure 7:
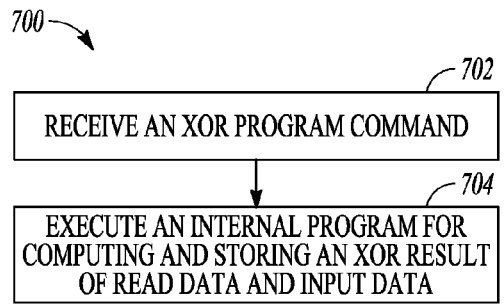
FIG. 7 is a flow diagram illustrating a method and apparatus for self-accumulating parity for memory systems, according to various embodiments.
Figure 8:
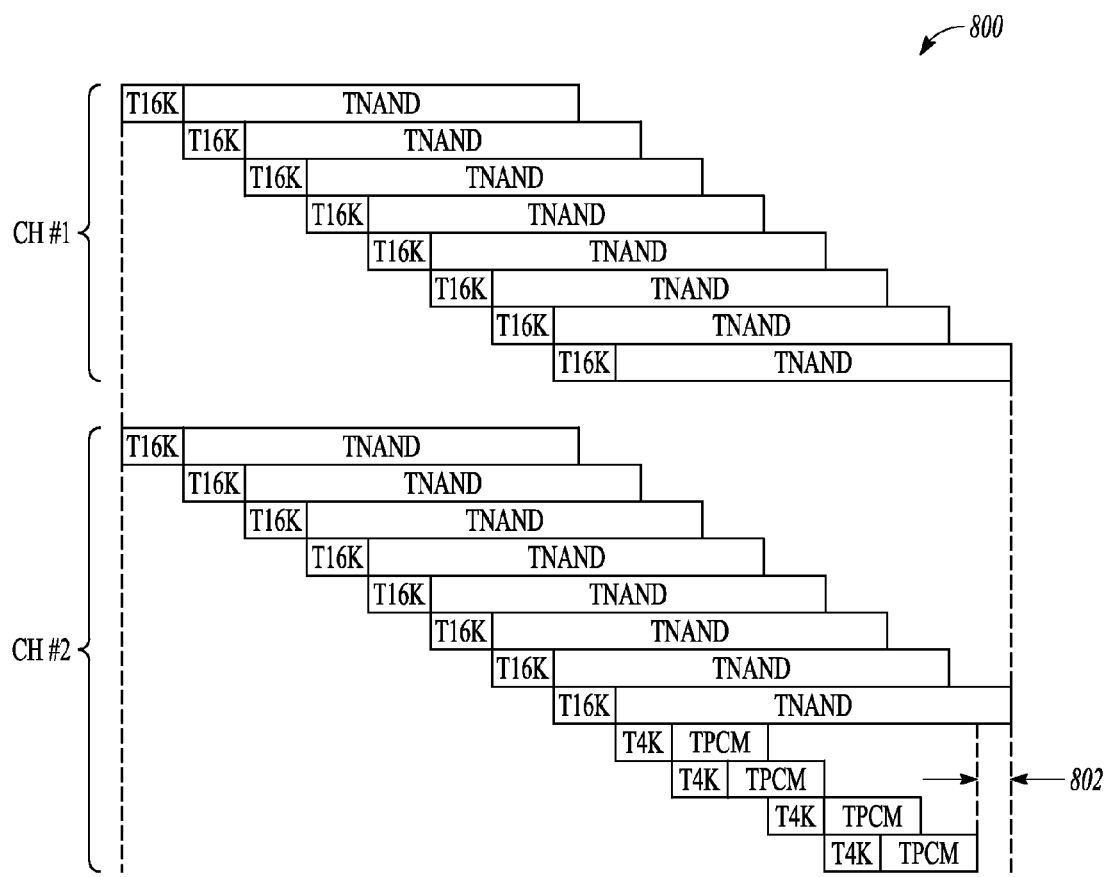
FIG. 8 is a high level diagram illustrating a calculated time margin for achieving a reduced system overhead during write operations, according to various embodiments.
Figure 9:
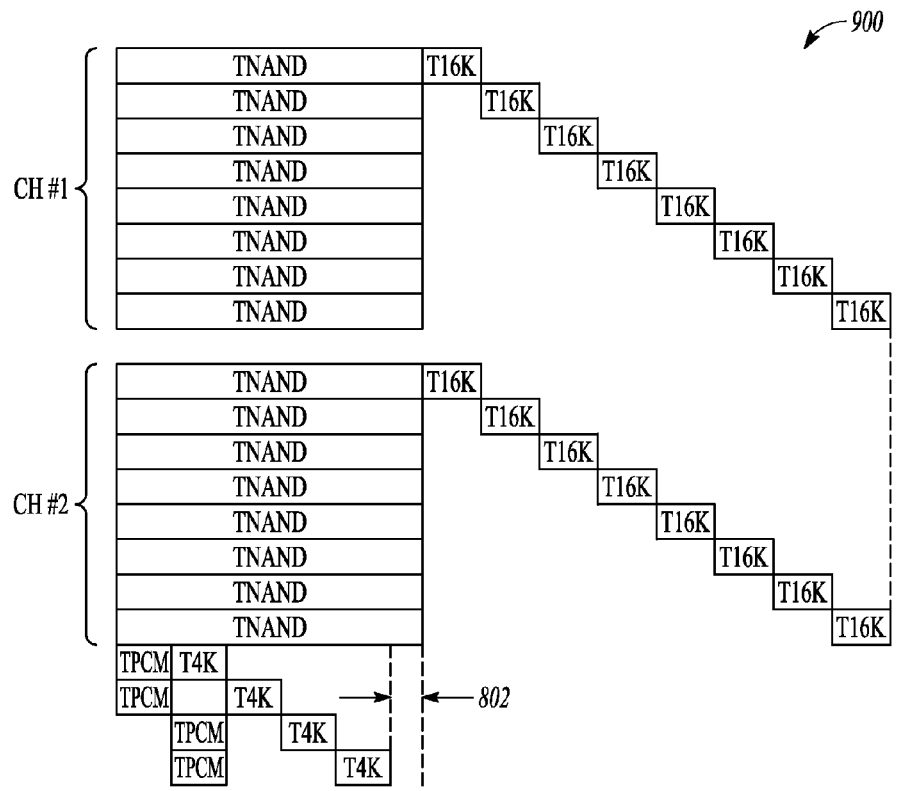
FIG. 9 is a high level diagram illustrating a calculated time margin for achieving a reduced system overhead during read operations, according to various embodiments.
Figure 10:
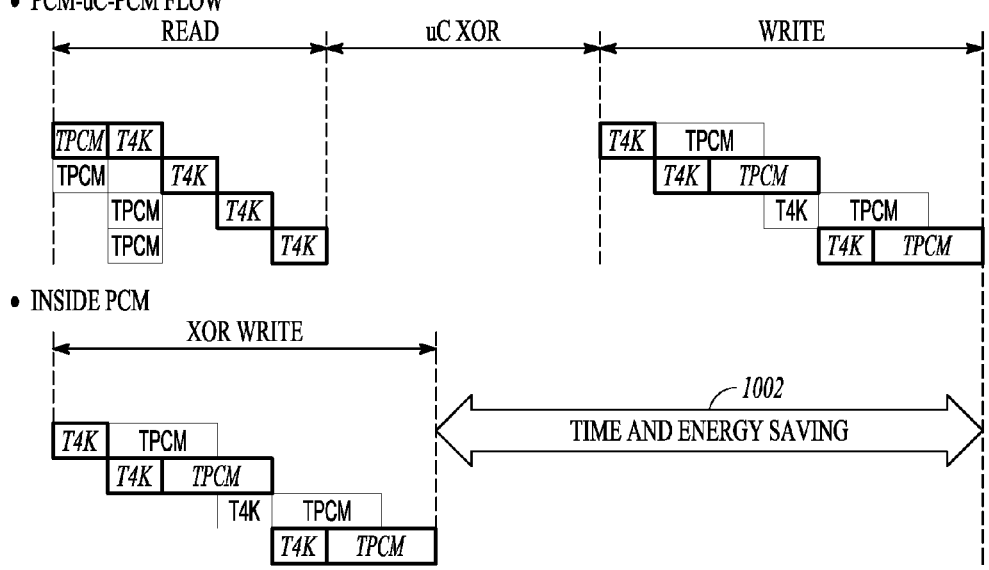
FIG. 10 is a diagram illustrating a reduced system overhead partial write operation, showing time and energy savings, according to various embodiments.
Figure 11:
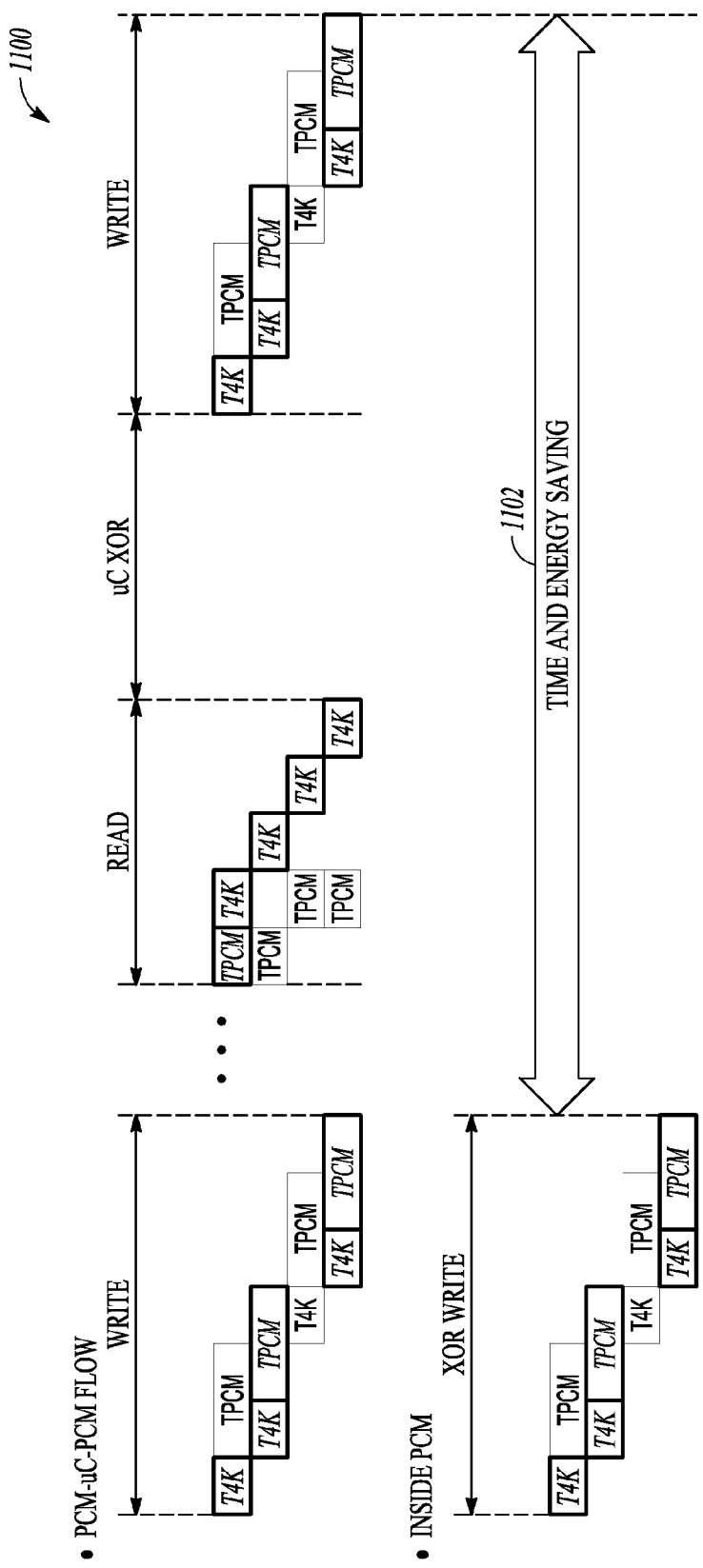
FIG. 11 is a diagram illustrating a reduced system overhead parity calculation, showing time and energy savings, according to various embodiments.

FIG. 7 below details a Self-Accumulating Exclusive OR Program mechanism for eliminating this costly overhead. FIGS. 8 and 9 below illustrate time margin constraints for achieving reduced system overhead during memory write and read operations respectively. FIGS. 10 and 11 below illustrate reduced system overhead in time and energy savings achieved by the Self-Accumulating parity mechanism using an Exclusive Or (XOR) Program.

Rather than relying on inefficient external controller 110 operations, the Self-Accumulating Exclusive OR mechanism detailed in FIGS. 7-11 accumulates the parity calculation in the auxiliary memory system 204 itself by superimposing new (i.e. updated) parity data over old previously calculated parity information (or on empty memory locations in case no previous parity information is available). This novel mechanism introduces a new internal self-accumulating parity program component in the auxiliary memory system 204 for reducing time and power consumption by eliminating unnecessary reading and writing between the external controller and the auxiliary memory system 204. Execution of this internal program component is realized by introducing a new command in the auxiliary memory. In one embodiment, the command is an "XOR program" command.

For simplicity, the Self-Accumulating Exclusive OR Program mechanism is shown to operate in a Hybrid Memory System (HMS) having NAND flash memory 202 coupled to a PCM auxiliary memory system 204, although the method may be applied to any type of memory system or configuration. One skilled in the art would understand that the Self-Accumulating Exclusive OR Program mechanism is not limited to an auxiliary memory device, and that the XOR program command is not limited to parity implementations but may be implemented in single chip or stand-alone device rather than a hybrid system, or as a stand-alone program for any applicable purpose. Memory parity applications may comprise hardware bit-alterable memories (e.g., PCM, etc.) as well as other types of memory in which bit-alterability is obtained by software. For example, emulation by writing bit-altered data to a different location with a corresponding up-date of a logical/physical address table (e.g., NAND Flash, NOR Flash, charge storage memories, etc.).

In a stand-alone device embodiment, a new command "XOR program" in its available command set causes instructions to be executed such that when the command is received with address and input data parameters, stored data is read at the input address and an XOR operation of the read data and new input data is performed and the results of the computation are written into memory, typically at same location of the input address received with XOR program command. However, a second address may be input with the command for storing the result of the XOR computation at a second address (e.g., read at the first address, and write at second address).

FIG. 7 is a flow diagram illustrating a method and apparatus for a Self-Accumulating XOR Program, according to various embodiments. In the single IC device embodiment, the XOR command is received in operation 702. The command may be received with address and input data parameters. An internal program for computing and storing an XOR result of read data and input data is performed in operation 704, e.g., by reading data stored at the input address, computing the XOR of the read data and the input data according to an XOR Program rule, and writing the result in memory. In some single IC device embodiments, the result is written at the input address. In other embodiments, a second address parameter is input with the XOR command for storing the program result at the second address.

Referring now to the self-accumulating parity function for a memory system embodiment, a Self-Accumulating Exclusive OR Program operating in a non-volatile memory device accumulates a parity for flash and other memory device types, and stores the parity result 302 in memory cells internal to the auxiliary memory system 204 itself without intervention by the external controller. The program is executed by the auxiliary memory 204 after receiving a program command. In one embodiment, the program command is an "XOR Program" command.

In one embodiment, a 16 KB NAND page has a 4 planes per page architecture. Parity is a 16 KB vector calculated as $$P = \sum_{i=1}^{n} D_i,$$

where n=16 is the number of pages that are readable or programmable at a time. In other words, the stripe dimension is equal to a number of NAND die in the auxiliary memory system 204 multiplied by the number of planes in each NAND device, while $D_i$ is the 16 KB page of the i-th plane. Because the parity sum is an exclusive logic sum (XOR), it is possible to retrieve lost data $D_j$, caused by a failure on the j-th page, by means of subtraction:

$$D_j = \sum_{i=1(i \neq j)}^{n} D_i - P.$$

Thus, it is also possible to write $$D_j = \sum_{i=1(i \neq j)}^{n} D_i + P$$

(i.e. the lost data is the XOR of the saved parity with the parity calculated excluding the irretrievable page $D_j$).

The traditional program rule is modified to create an XOR program rule for supporting a Self-Accumulating Exclusive OR Program. The Traditional Program Rule is shown in Table 1 below:

TABLE 1

Traditional Program Rule

| | Stored | |
|---|---|---|
| New | 0 | 1 |
| 0 | 0 (No Action) | 0 (Reset) |
| 1 | 1 (Set) | 1 (No Action) |

Traditional Operations
0 → 1 = Set
1 → 0 = Reset

The traditional program rule of Table 1 is replaced by the XOR program rule of Table 2.

TABLE 2

XOR Program Rule

| | Stored | |
|---|---|---|
| New | 0 | 1 |
| 0 | 0 (no action) | 1 (no action) |
| 1 | 1 (Set) | 0 (Reset) |

XOR Truth Table

| 00 | 0 |
| 01 | 1 |
| 10 | 1 |
| 11 | 0 |

The XOR Program Rule of Table 2 allows the execution of the self-accumulating parity program to occur directly in the Auxiliary memory system 204, producing time and power savings in both partial write events and in the second XOR evaluation operation. The modified XOR Program Rule of Table 2 replaces the Traditional Program Rule shown in Table 1 in the standard parity algorithm executed by the external controller 110, using temporary storage areas for calculations. Self-Accumulating Exclusive OR Program 700 establishes a new program command in the auxiliary memory system 204, that uses the XOR Program Rule of Table 2 rather than the "Traditional Program Rule" shown in Table 1. In some embodiments, the new program command is named 'XOR Program". In Tables 1 and 2 above, "Set" (0→1) and "Reset" (1→0) may refer to the specified operation (e.g., data overwriting) in a Phase Change Memory, or, more generally, in any kind of memory, e.g., a bit-alterable IC device or an emulation bit-alterable memory.

This efficient self-accumulating parity program implementation does not introduce time or power overhead to the parity program and the read operations or, depending on system parameters, introduce an unacceptable impact to the global performance of the system. In cases where an entire block stripe 602 is written or read, system performance reduction may also be prevented. In the exemplary HMS architecture 200 of FIG. 2 having a 16 GB NAND with a 16 KB page size and 4 planes, as well as a 2 Giga-Byte (GB) Auxiliary memory system 204 having a 4 KB page and 2 planes, there is no programming overhead when the following write condition is realized:

$$T_{NAND}(Pg) > 3T_{4K} + 2T_{PCM}(Pg), \quad \text{(Equation 3)}$$

where $T_{NAND}$ (Pg) is the time needed to program an entire NAND page (16 KB), $T_{PCM}$(Pg) is the time needed to program an entire PCM page (4 KB), and $T_{4K}$ is the transmission time of 4 KB data in the channel.

Likewise, there is no overhead in read operations when the following read condition is realized:

$$T_{NAND}(Rd) > 4T_{4K} + T_{PCM}(Rd), \quad \text{(Equation 4)}$$

where $T_{NAND}$ (Rd) is the time needed to read an entire NAND page (16 KB), $T_{PCM}$(Rd) is the time needed to read an entire PCM page (4 KB), and $T_{4K}$ is the transmission time of 4 KB data in the channel.

These read and write performance conditions are determined by the characteristics of two channels shared by multiple NAND devices and one PCM memory system with serialized transmission of data, and independent NAND and PCM planes that can be written and read in parallel.

Self-Accumulating Exclusive OR Program system methodology 700 begins in operation 702 by receiving a Self-Accumulating program command (or "XOR Program" command). Control flows to operation 704 where a parity is accumulated in the auxiliary memory system 204 according to Equation 1 and the XOR Program Rule of Table 2, by superimposing previously stored parity information with new parity information.

According to the traditional program rule shown in Table 1, when a previously stored parity bit has a value of 0 and a new parity bit value is also equal to 0, no new parity bit value is superimposed in an internal storage memory cell of the auxiliary memory system's 204 parity value. When a previously stored parity bit has a value of 0 and a new parity bit value is equal to 1, a new parity bit value of 1 is superimposed in the corresponding internal parity memory cell of the auxiliary memory system 204 over the previous value of 0. In other words, a Set operation is performed, wherein a Set operation refers to the operation of programming a bit to 1. When a previously stored parity bit has a value of 1 and a new parity bit value is equal to parity bit value of 0 is superimposed in the auxiliary memory system's 204 internal parity storage memory cell. In other words, a Reset operation is performed, wherein a reset operation refers to the operation of programming a bit to 0. When a previously stored parity bit has a value of 1 and a new parity bit value is also equal to 1, no new parity bit value is superimposed in an internal storage memory cell of the auxiliary memory system's 204 parity value. However, these operations cannot be performed directly in the auxiliary memory system 204.

Rather than the Traditional Program rule of Table 1, Self-Accumulating Parity for Memory uses the novel XOR program rule of Table 2. The effect of the XOR Program Rule is to realize an XOR operation directly in the memory device, saving time as well as power during partial writes and during the second operation of the RAIN XOR evaluation that sums parities for even and odd pages, while read accesses by the external controller 110 are eliminated entirely. These time and power savings are detailed below in FIGS. 10 and 11.

Each memory cell is pulsed according to the XOR Program Rule. In contrast to the Traditional Program Rule, the XOR Program Rule causes a reset pulse when the stored bit is equal to 1 and the new bit is also equal to 1. The XOR Program Rule causes a set pulse when the stored bit is equal to 0 and the new bit is equal to 1. In the remaining 2 cases where the new bit is equal to 0, the internal memory cell is not pulsed. Therefore, when a previously stored parity bit has a value of 0 and a new parity bit value is equal to 1, a new parity bit value of 1 is superimposed in the corresponding internal parity memory cell of the auxiliary memory system 204 over the previous value of 0. In other words, a Set operation is performed, wherein a set operation refers to the operation of programming a bit to 1. When a previously stored parity bit has a value of 1 and a new parity bit value is equal to 0, no new parity bit value is superimposed in an internal storage memory cell of the auxiliary memory system's 204 parity value. When a previously stored parity bit has a value of 1 and a new parity bit value is also equal to 1, parity bit value of 0 is superimposed in the auxiliary memory system's 204 internal parity storage memory cell. In other words, a Reset operation is performed, wherein a reset operation refers to the operation of programming a bit to 0. When a previously stored parity bit has a value of 0 and a new parity bit value is also equal to 0, no new parity bit value is superimposed in an internal storage memory cell of the auxiliary memory system's 204 parity value.

Thus, an auxiliary memory element is programmed to direct an internal controller to accumulate and store a parity sum by setting and resetting previously stored parity bit values according to conditions defined by an Exclusive Or (XOR) truth table, shown in Table 2. Each newly calculated bit value is superimposed in the corresponding final internal bit storage location, (e.g., the parity memory cell) of the auxiliary memory system 204.

FIG. 8 is a high level diagram illustrating a calculated time margin 802 for achieving a reduced system overhead during write operations 800, according to various embodiments. An exemplary Write operation 800 in a HMS 200 for generating self-accumulating parity using a RAIN mechanism 300 that implements the XOR Program Rule of Table 2 shows the margin 802 for avoiding write operation overhead, according to Equation 3.

In a case of a partial write, only a portion of the pages in the same stripe area are up-dated, the time margin 802 may increase. For example, if a single page $D_k$ is written, the existing parity data stored in the Auxiliary memory 215 may be up-dated directly with the input data written in the page using the XOR program approach described above.

FIG. 9 is a high level diagram illustrating a calculated time margin 902 for achieving a reduced system overhead during read operations 900, according to various embodiments. An exemplary Read operation 900 in a HMS 200 for generating self-accumulating parity using a RAIN mechanism 300 that implements the XOR Program Rule of Table 2 shows the margin 902 for avoiding read operation overhead, according to Equation 4.

FIG. 10 is a diagram illustrating a reduced system overhead partial write operation 1000, showing time and energy savings 1002, according to various embodiments. As shown, FIG. 10 details a portion of time and energy savings 1102 over traditional partial write operations having high system overhead. When data cannot be fully written in one operation, partial write operations occur at different times on the same virtual stripe before calculating new parity in the first XOR operation of the RAIN method using the XOR Program Rule. During traditional partial (or intermediate) write operations, the external controller 110 generates time and power overhead by reading the previous parity stored in the auxiliary memory system 204. On the contrary, using Self-Accumulating Exclusive OR Program methodology the existing parity data stored in the auxiliary memory system 204 may be up-dated at each partial write operation directly with the parity of page, or pages, written (for example directly with input data written in a single page $D_k$ of NAND flash 202). Self-Accumulating Exclusive OR Program methodology eliminates reading of the previous parity stored in the auxiliary memory system 204 by the external controller 110, eliminating the time and energy overhead 1002 during partial write operations.

FIG. 11 is a diagram illustrating a reduced system overhead parity operation 1100, showing time and energy savings 1102, according to various embodiments. As shown, FIG. 11 details a portion of time and energy savings 1102 over a traditional parity execution having high overhead. The second XOR operation for calculating even and odd pages parities of a traditional parity operation is typically performed by reading the parity information from the auxiliary memory system 204 by the external controller 110 before the external controller 110 updates the old parity information with parity for new data pages. Again, these reading, calculating and writing operations by the external controller 110 squander resources of both time and energy during the external controller 110 operations when generating the even and odd parities 1102.

The second XOR operation time and energy savings 1102 are realized by accumulating the parity sums directly in the auxiliary memory system 204 to avoid data exchanges between the auxiliary memory system 204 and the external controller 110. This method of Self-Accumulating Exclusive OR Program 700 avoids traditional unnecessary storing of the intermediate parity results from the first XOR sum 616 of all the pages 510 in the Virtual Block 602 in a temporary XOR storage area 610 during the opening of the Virtual Block 602. Rather, the intermediate parity sum result from the first XOR operation 616 is stored directly in the final parity storage memory cell 614.

The apparatus of various embodiments includes or can be included in electronic circuitry used in high-speed computers, communication and signal processing circuitry, memory modules, portable memory storage devices (e.g., thumb drives), single or multi-processor modules, single or multiple embedded processors, multi-core processors, data switches, and application-specific modules including multi-layer, multi-chip modules. Such apparatus may further be included as sub-components within a variety of electronic systems, such as televisions, memory cellular telephones, personal computers (e.g., laptop computers, desktop computers, handheld computers, tablet computers, etc.), workstations, radios, video players, audio players (e.g., MP3

(Motion Picture Experts Group, Audio Layer 3) players), vehicles, medical devices (e.g., heart monitor, blood pressure monitor, etc.), set top boxes, and others.

The above description and the drawings illustrate embodiments to enable those of ordinary skill in the art to practice the embodiments. Other embodiments may incorporate structural, logical, electrical, process, and other changes. In the drawings, like features or like numerals describe substantially similar features throughout the several views. Portions and features of some embodiments may be included in, or substituted for, those of others. Many other embodiments will be apparent to those of skill in the art upon reading and understanding the above description.

The Abstract of the Disclosure is provided to comply with 37 C.F.R. § 1.72(b), requiring an abstract that allows the reader to quickly ascertain the nature of the technical disclosure. The Abstract is submitted with the understanding that it will not be used to interpret or limit the claims.

What is claimed is:

1. An Integrated Circuit (IC) device comprising:
a memory system to receive a program command from a controller, the memory system including a non-volatile auxiliary memory to store an Exclusive OR (XOR) program, the non-volatile auxiliary memory to execute the XOR program in response to the program command to achieve reduced system overhead during memory write and read operations in the memory system and to reduce time and power consumption, the non-volatile auxiliary memory, based on the XOR program, to,
update a parity bit of previous parity information stored in the non-volatile auxiliary memory of the memory system based on a first value of a parity bit of updated parity information regardless of a value of the parity bit of the previous parity information, wherein the non-volatile auxiliary memory updates the parity bit of the previous parity information without intervention from the controller after the memory system receives the program command from the controller, and
keep the parity bit of the previous parity information at a same value based on a second value of the parity bit of the updated parity information, the second value being different from the first value, wherein the non-volatile auxiliary memory keeps the parity bit of the previous parity information at the same value without intervention from the controller after the memory system receives the program command from the controller,
wherein the previous parity information is associated with first data stored in the non-volatile auxiliary memory of the memory system, and
wherein the updated parity information associated with second data different from the first data, and the updated parity information is included in an accumulated parity sum of data stored in the memory system for recovering an original data from a corrupted data in the memory system.

2. The IC device of claim 1 wherein the XOR program operates to receive an input address and an input data from a controller when the program command is provided to the memory system from the controller.

3. The IC device of claim 2 wherein the XOR program operates to obtain read data stored at the input address, to perform an XOR operation of the read data and the input data to generate the parity information, and to write the parity information in the IC device.

4. The IC device of claim 1 wherein the IC device comprises a memory device.

5. The IC device of claim 1 wherein the IC device comprises a non-volatile memory device.

6. The IC device of claim 5 wherein the non-volatile memory device comprises a phase change memory.

7. The IC device of claim 1 configured to have a command set including the program command.

8. The IC device of claim 1 configured to comprise program instructions for implementing the program command.

9. A method of parity generation in a memory system, the method comprising:
receiving a program command at the memory system, the program command provided from a controller, wherein receiving the program command is performed by the memory system, the memory system including a non-volatile auxiliary memory to store an internal program; and
responsive to receiving the program command, the non-volatile auxiliary memory of the memory system executing the internal program to achieve reduced system overhead during memory write and read operations in the memory system and to reduce time and power consumption, the non-volatile auxiliary memory, based on the internal program, to accumulate a parity sum by either,
updating, performed by the non-volatile auxiliary memory of the memory system without intervention from the controller after the program command is provided to the memory system, a parity bit of previous parity information stored in the memory system regardless of a value of the parity bit of the previous parity information if a parity bit of the updated parity information has a first value, or
keeping, performed by the non-volatile auxiliary memory of the memory system without intervention from the controller after the program command is provided to the memory system, the parity bit of the previous parity information at a same value if the parity bit of the updated parity information has a second value, the second value being different from the first value, the previous parity information associated with first data stored in the non-volatile auxiliary memory of the memory system, the updated parity information associated with second data, the second data provided to the memory system from the controller when the program command is provided to the memory system from the controller, wherein the updated parity information is included in an accumulated parity sum of data stored in the memory system for recovering an original data from a corrupted data in the memory system.

10. The method of claim 9 wherein the internal program implements an Exclusive Or (XOR) Program.

11. The method of claim 9 wherein the first value of the parity bit of the updated parity information is equal to 1, and updating the parity bit of the previous parity information includes changing the value of the parity bit of the previous parity information from 1 to 0.

12. The method of claim 9 wherein the first value of the parity bit of the updated parity information is equal to 1, and updating the parity bit of the previous parity information includes changing the value of the parity bit of the previous parity information from 0 to 1.

13. The method of claim 9 wherein the internal program refrains from temporarily storing the updated parity information in external temporary storage areas.

14. The method of claim 9 further comprising:
executing the internal program, performed by the non-volatile auxiliary memory, to accumulate a parity sum for a plurality of data pages in the memory system; and
recovering an original page of data from a corrupted data page in the plurality of data pages by subtracting from the accumulated parity sum a parity sum of all data pages the plurality of pages except the corrupted data page.

15. A non-transitory computer-readable medium comprising instructions that, when implemented on a machine, cause the machine to:
execute an internal program stored in a non-volatile auxiliary memory in a memory system in response to a program command provided to the memory system from a controller to achieve reduced system overhead during memory write and read operations in the memory system and to reduce time and power consumption, wherein the internal program stored in a non-volatile auxiliary memory in the memory system operates to accumulate a parity sum by either,
updating, performed by the non-volatile auxiliary memory without intervention from the controller after the program command is provided to the memory system, a parity bit of previous parity information stored in the non-volatile auxiliary memory of the memory system regardless of a value of the bit of the previous parity information if a parity bit of the updated parity information has a first value, or
keeping, performed by the non-volatile auxiliary memory without intervention from the controller after the program command is provided to the memory system, the parity bit of the previous parity information at a same value if the parity bit of the updated parity information has a second value, the second value being different from the first value, the previous parity information associated with first data stored in the non-volatile auxiliary memory of the memory system, the updated parity information associated with second data, the second data provided to the memory system from the controller when the program command is provided to the memory system from the controller, and the updated parity information is included in an accumulated parity sum of data stored in the memory system for recovering an original data from a corrupted data in the memory system.

16. The computer readable medium of claim 15 wherein the internal program operates to generate the updated parity information from data pages.

17. The computer readable medium of claim 15 wherein the program implements an XOR logical operation for updating parity bit values of the previous parity information.

18. An apparatus comprising:
a first non-volatile memory device in a memory system to store data information; and
a second non-volatile memory device in the memory system to store an internal program and to store parity information associated with the data information stored in the first non-volatile memory device, the second non-volatile memory device to execute the internal program in response to a program command to achieve reduced system overhead during memory write and read operations in the memory system and to reduce time and power consumption, the second non-volatile memory device, based on the internal program, to either overwrite old parity information stored in the second non-volatile memory device with new parity information in response to a program command provided by a controller regardless of a value of the old parity information if the new parity information has a first value, wherein the second non-volatile memory device overwrites the old parity information without intervention from the controller after the memory system receives the program command from the controller or keep the old parity information at a same value if the new parity information has a second value, wherein the second non-volatile memory device keeps the old parity information the same value without intervention from the controller after the memory system receives the program command from the controller, the second value being different from the first value, the old parity information associated with first data stored in the second non-volatile memory device, the new parity information associated with second data, the second data provided from the controller when the program command is provided, wherein the new parity information is included in an accumulated parity sum of data stored in the memory system for recovering an original data from a corrupted data in the memory system.

19. The apparatus of claim 18, wherein the first and second non-volatile memory devices comprise different non-volatile memory types.

20. The apparatus of claim 18, wherein the first non-volatile memory device includes a flash memory device.

21. The apparatus of claim 18, wherein the second non-volatile memory device includes a phase change memory device.

* * * * *